United States Patent [19]

Bishop et al.

[11] Patent Number: 4,536,438

[45] Date of Patent: Aug. 20, 1985

[54] FIBRE REINFORCED COMPOSITES

[75] Inventors: Sarah M. Bishop; Paul T. Curtis, both of Farnborough, England

[73] Assignee: The Secretary of State for Defence in Her Brittanic Majesty's Government of the United Kingdom of Great Britain and Northern Ireland, London, England

[21] Appl. No.: 588,107

[22] Filed: Mar. 9, 1984

[30] Foreign Application Priority Data

Mar. 10, 1983 [GB] United Kingdom ............... 8306653

[51] Int. Cl.³ .............................................. B32B 7/00
[52] U.S. Cl. ................................... 428/246; 428/232; 428/257; 428/292; 428/293; 428/367; 428/408; 428/902
[58] Field of Search ............... 428/246, 292, 293, 367, 428/408, 902, 257, 232

[56] References Cited

U.S. PATENT DOCUMENTS 4,055,697 10/1977 Schmanski ......................... 428/408

Primary Examiner—James J. Bell
Attorney, Agent, or Firm—Cushman, Darby & Cushman

[57] ABSTRACT

A fibre reinforced composite comprises one or more layers of unidirectional non-woven fibres alternated with one or more layers of woven fibres, preferably in a satin, embedded in a plastics matrix.

7 Claims, 3 Drawing Figures

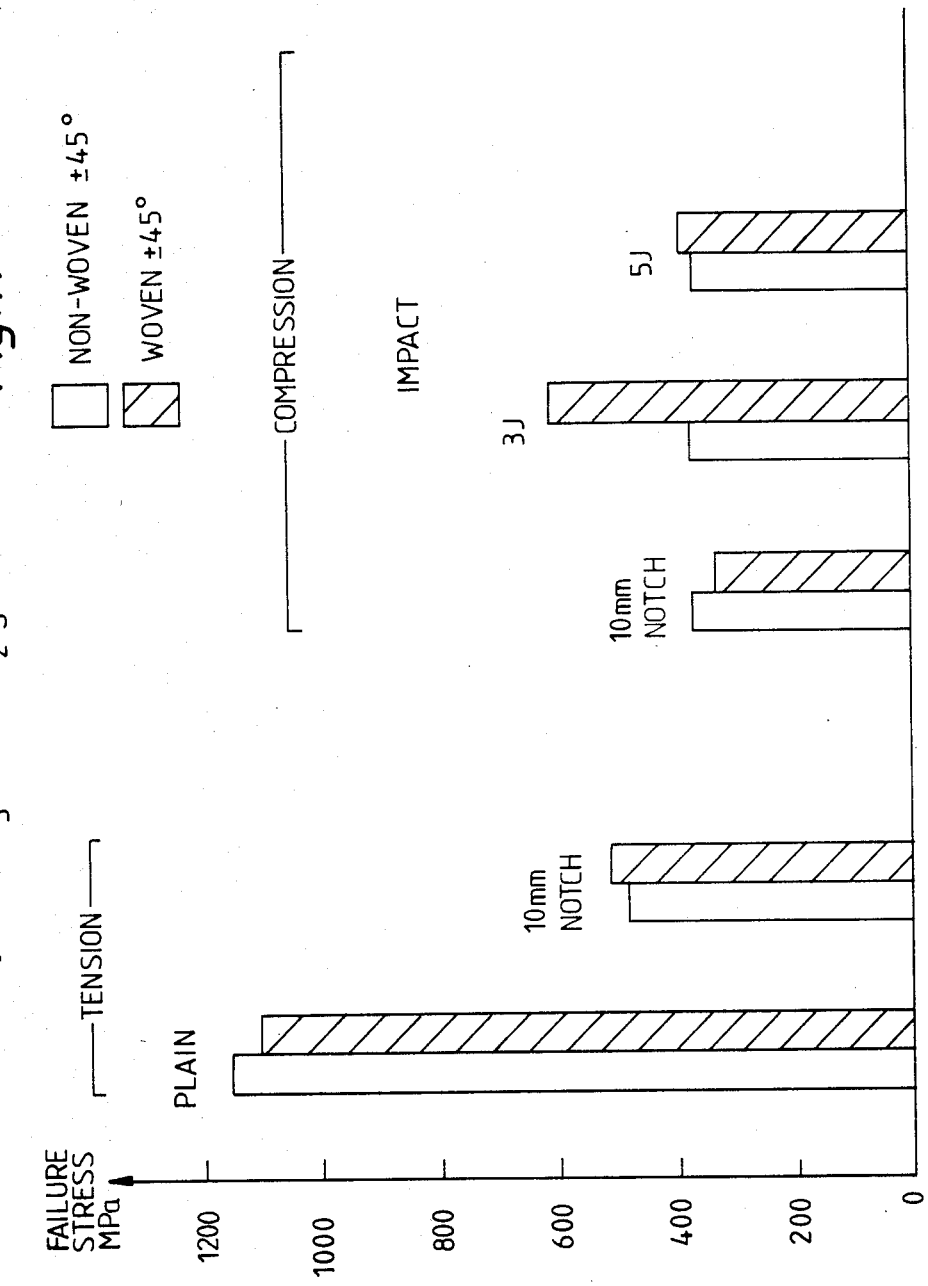

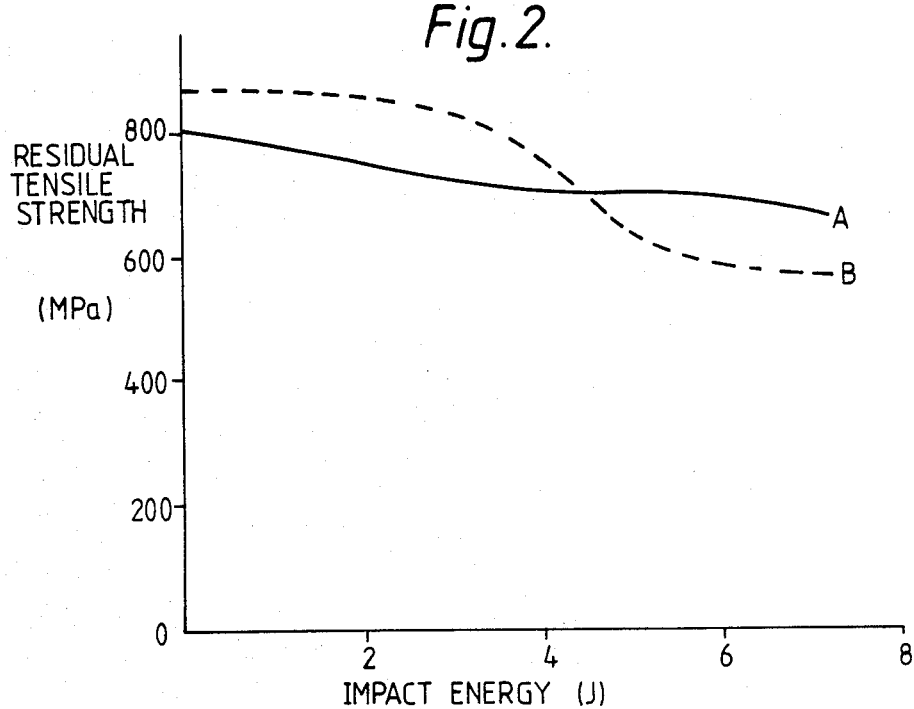
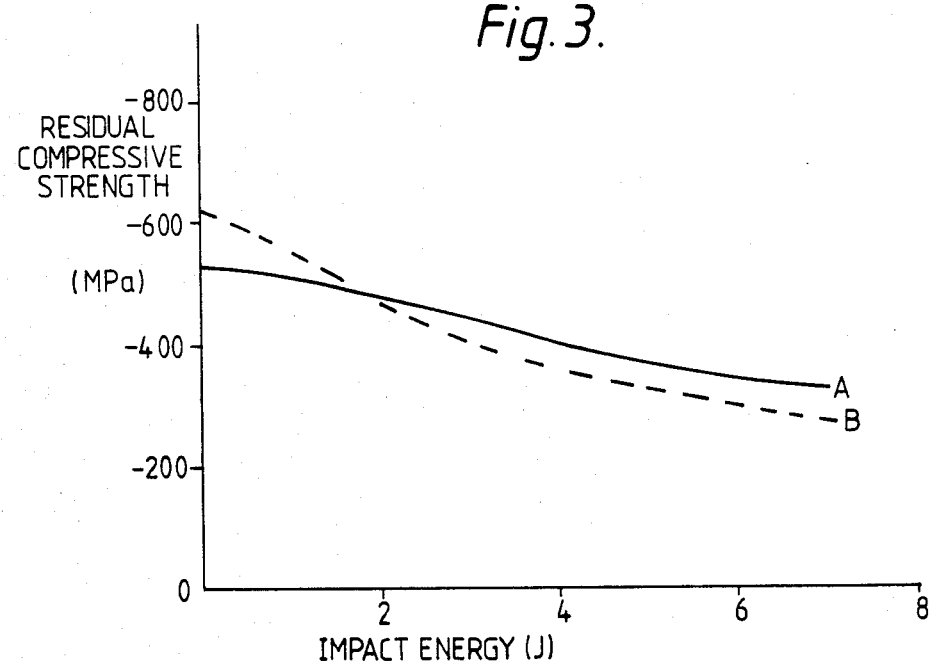

FIBRE REINFORCED COMPOSITES

The present invention relates to fibre reinforced composites suitable for aerospace applications.

Fibre reinforced composites are being used in aerospace applications because of the high strength to weight ratio of such materials compared to materials conventionally used. Use of such composites in aircraft allows more efficient use of fuel and improved radius of operation or increased payload capability. In addition such composites allow cost reductions to be made due to the ability to mould complex structures in one operation and the need for fewer labour intensive joining processes.

According to the present invention a fibre reinforced composite includes one or more layers of unidirectional non-woven fibres alternated with one or more layers of woven fibres, embedded in a plastics matrix.

The fibres of the woven and non-woven layers may be any known fibres used in fibre reinforced composites, including carbon fibres and Kevlar and the fibres of the woven fabric may be the same as those of the non-woven layers or they may be different. Kavlar is a trade name for aramid fibres.

The fibres in each layer, particularly in the woven layers, may be a mixture of different fibres. For example, the fibres in each woven layer may be a mixture of carbon and Kevlar fibres optionally together with glass fibres. A preferred blend of carbon and Kevlar fibres is a mixture containing from 0 to 30% of Kevlar fibres, eg 25% Kevlar, based on the total number of fibres present.

The plastics of the plastics matrix may be any known thermosetting plastics material or thermoplastics material used in fibre reinforced composites such as for example an epoxy resin.

Woven fabrics have considerable advantages over unidirectional fibres in that they are easier to handle, are able to conform to complex shapes and have more isotropic in-plane properties than unidirectional fibres. However composites containing woven fabric reinforcement are less strong and less stiff than equivalent unidirectional fibre reinforced composites because of distortion of the woven fibres where the weft and warp threads intersect. In addition composites containing woven fabric reinforcement tend to be thicker than equivalent unidirectional fibre reinforced composites. This is partly due to the lower fibre volume fraction of composites containing woven fabric and partly due to the fabric having more fibres by weight than unidirectional fibre material.

In any weave there are two sets of threads, the weft and the warp, which cross each other at right-angles. The way in which the weft and warp intersect and the number of intersections decide the pattern of the fabric. At the points where the weft and warp threads intersect the threads are distorted which is undesirable in woven fabrics intended to be used as reinforcement in composites. Fibre distortion causes a reduction in mechanical properties of a composite incorporating woven fabric and the greater the distortion ie the greater the number of weft and warp intersections the greater the reduction in mechanical properties. Thus fibre reinforced composites in which woven fabrics are used as reinforcement have generally poorer mechanical properties than equivalent composites in which non-woven unidirectional fibres are used as reinforcement.

The woven fibres incorporated in the composites of the present invention may have any pattern of weave including a plain weave or satin weave. However those weaves which have fewest intersections of weft and warp, ie least fibre distortion, for example satin weaves, are preferred. In particular five or more, eg. eight, shaft satin weaves are preferred. Plain weaves are the least desirable because of the large number of weft and warp intersections in such weaves.

A fibre reinforced composite according to the present invention may include any number of woven fibre layers and any number of unidirectional non-woven fibre layers. The total number of fibre layers incorporated in a composite will be determined by the requirements of the end use of the composite. The woven fibre layers are alternated with the unidirectional non-woven fibre layers and the sequence in which the various layers are alternated, ie the stacking sequence, may be varied so as to achieve the most desirable mechanical properties in the final composite.

Any convenient stacking sequence may be used. It may be a simple one in which for example two layers of woven fibres are alternated with two layers of unidirectional fibres or for example one layer of woven fibres alternated with two layers of unidirectional fibres or the stacking sequence may be more complex as for example one layer of unidirectional fibres alternated with one layer of woven fibres and another layer of unidirectional fibres. It will be appreciated that a sequence may be repeated any number of times to build up the required composite. It is preferred that the overall sequence within the final composite is symmetrical ie that the various layers are stacked so that one half of the composite is a mirror image of the other half. The outermost layers of fibres ie at the surfaces of the composite are preferably the woven fibres. It is preferred that the woven fibre layers are orientated with respect to the unidirectional non-woven fibre layers so that neither the fibres of the weft nor the warp are parallel with the unidirectional fibres and it is preferred that the unidirectional fibre layers are orientated to be parallel.

The angle of orientation between fibres in the layers of woven fibres and the fibres in the layers of unidirectional fibres may be any angle between 0° and ±20°, although it is preferred that the angle or orientation is ±45°. The preferred lay-up is a 0°, ±/−45° arrangement in which the woven layers are orientated so that there is a mixture of woven layers, some with the warps at +45° to the unwoven fibres and some with the wefts at +45° to the unwoven fibres. Preferably, for an even number of woven layers, there are the same number of layers having warps at +45° to the unwoven fibres as layers having wefts at +45° to the unwoven fibres. For an odd number of woven layers there are preferably $(m-1)/2$ and $(m+1)/2$ layers of the two possible kinds, m being the number of layers in the woven stack of layers contained in the composite. Preferably, like layers are equidistant from the centre of the stack of woven layers although this feature cannot always be achieved if balancing of fibre distortion in the layers is to be achieved as described below.

Woven fabrics with weaves such as satin weaves have a predominance of warp fibres on one surface and a predominance of weft fibres on the other and where woven fabrics with such weaves are used for the woven layes of a composite according to the present invention it is preferred that as far as these 2 kinds of surface are concerned, the woven layers are arranged so that each woven layer has at least one of its surfaces facing a surface of the other kind on a neighbouring woven layer. Such pairs of surfaces may face each other directly or there may be one or more layers of the unwoven fibres between them.

It has been found that composites embodying the present invention have mechanical properties as good as those exhibited by equivalent composites containing only non-woven unidirectional fibres. Moreover it has been found that the composites embodying the present invention sustain less impact damage than equivalent unidirectional fibre reinforced composites and that they have improved residual tensile and compressive strengths after impact. In addition the composites of the present invention have superior mechanical properties and residual strengths to those of wholly woven fabric reinforced composites.

The combination of undistorted unidirectional fibres in the 0° principal loading direction, alternated with single woven fabric layers is the preferred combination of woven and non-woven materials. The undistorted 0° fibres contribute to the strength and stiffness of an equivalent wholly unidirectional fibre reinforced composite. Moreover 0° shear splitting allows crack blunting to occur, and this imparts toughness and reduced notch sensitivity to the composites. In addition the woven +/−45° layers restrict 45° cracking which can weaken adjacent 0° layers in equivalent unidirectional fibre reinforced composites. However the +/−45° layers still allow adequate load transfer between the 0° layers.

The containment of impact damage in composites of the present invention should impede damage growth under fatigue loading and thus residual fatigue lives of the composites are anticipated to be superior to equivalent unidirectional fibre reinforced composites. Improvements in the strength of composite panels with bolted joints at loaded holes may also be achieved. In addition the lower levels of impact damage to the composites may lead to reduced moisture ingress and in consequence less severe environmental degradation. In aerospace applications smaller areas of damage from in-service impacts would reduce the effort required in repair and where an airflow passes over composite panels may also help to maintian aerodynamic smoothness.

In this specification a n-shaft (where n is an integer, eg 5) satin weave means a weave in which each woven thread or tow of fibres in the weft is woven over n−1 and under one warp tows for each group of 5 warp tows (or each tow of fibres in the warp is woven over n−1 and under one weft tows). Where each weft is woven over a series of n−1 warps and then under the next warp the warp under which adjacent wefts are woven may be displaced in the pattern progressively from weft-to-weft. This displacement, eg by 2 to 8 warps, is known in the weaving art as the 'progressive number' of the pattern.

It will be familiar to those skilled in the weaving art that the point at which each weft is woven under each one warp after being woven over each n−1 warps gives a point of fibre distortion. The points of distortion as a sequence run in a line at an angle to the warp and weft directions, the angle being 26½° to the warp direction when the progressive number is 2 for a five-shaft satin weave. This angle may be +26½° or −26½° depending on whether the displacement of the point of distortion from warp-to-warp is made in a positive or negative sense. The sign of this angle may also be reversed simply by changing from a warp predominant surface to a weft predominant surface, ie inverting a woven layer.

Preferably, in composites embodying the present invention an attempt is made to balance the layers of woven fibres between those having the line between the points of distortion running at a positive angle to the warp direction and those having the line between the points of distortion running at a negative angle to the weft direction in order to balance internal stresses produced in the stack of layers incorporated within the composite, otherwise an increased tendency to produce bending or fracture of the composite may be produced. Preferably, the positive and negative angles are equal. Preferably the type of weave used in each woven layer in the composite is the same.

For an even as well as an odd number of woven layers it is not, in general, always possible to balance about the plane of symmetry (defined by the centre of the stack of woven layers) both the angles of fibre distortion lines as described above as well as the warp and weft directions (ie warp or weft at ±45° to the unwoven fibres) although preferably one of these two features is balanced as far as possible about the centre of the stack.

Balancing the angles of fibre distortion lines balances contractions in the composite whereas balancing the warp and weft directions balances differences in stiffness in the composite. Preferably, the angles of the fibre distortion lines are balanced. In any event, the properties of the outermost woven layers (at opposite ends) of the stack are preferably balanced about the centre of the stack.

For a stack of four identical five-shaft satin weave layers having a pregressive number of 2 the following stacking sequence is preferred in the formation of the composite:

|  | Warp direction (angle in degrees from the unwoven fibre direction) | Weft direction (angle in degrees from the unwoven fibre direction) | Angle of line of fibre distortion (angle in degrees from the unwoven fibre direction) |
| --- | --- | --- | --- |
| 1st layer | +45° | −45° | +18.5 |
| 2nd layer | +45° | −45° | −18.5 |
| 3rd layer | −45° | +45° | −18.5 |
| 4th layer | −45° | +45° | +18.5 |

Composites embodying the present invention are particularly useful where a combination of good impact performance, strength and stiffness are required, eg airframe components such as fuselages, wings and engine casigs as well as other structures such as vehicles and boats.

Embodiments of the present invention will now be described by way of example and with reference to the accompanying drawings in which:

FIG. 1 is a histogram comparing failure stress of composites according to the present invention with equivalent wholly non-woven composites;

FIG. 2 is a plot of residual tensile strength against impact energy.

EXAMPLE 1

Composites were moulded with woven and non-woven unidirectional layers of high strength carbon fibres pre-impregnated with a n MY720 based epoxy resin. The carbon fibre fabric was a balanced five shaft satin weave (progressive number 2—see below), woven with 3000 filament tows of the same fibre type used in the non-woven material, but including a fine tracer tow of Kevlar 49 fibres every 50 mm. In this weave about 80% of the warp fibres lie one one side of the fabric, and correspondingly about 80% of the weft fibres lie at right angles to warp on the other side of the fabric. Since one pre-preg layer of woven fabric was approximately twice as thick (0.267 mm) as a layer of non-woven unidirectional material (0.125 mm), each layer of woven fabric was similar to two layers of non-woven unidirectional pre-preg stacked at 90° to each other as in a 0°, 90° or +/−45° lay-up. Composites with a 0°, +/−45° lay-up were made with various stacking sequences from non-woven unidirectional and woven fabric; the 0° layers being unidirectional material and the +/−45° layers being the woven material.

Two series of composites were made using unidirectional pre-preg from the same fibre-resin batch. However the woven pre-preg used for the first series (1 mm thick) was from a different fibre-resin batch to that used for the second series (2 mm thick).

The composites were cured in an autoclave using a standard cure schedule for the resin system and the quality of the composites was checked using ultrasonic c-scanning equipment. The composites were stored in a controlled environment at room temperature until the moisture content reached a constant value of about 1%.

Tensile tests were carried out on coupons 250 mm long, plain ones being 20–25 mm wide and notched ones being 50 mm wide, each notched coupon containing a sharp central notch 10 mm in length or a central 10 mm diameter hole. Aluminium end plates were bonded to the ends of plain coupons. Coupons were loaded parallel to the 0° direction on a screw driven test machine at a constant cross-head speed.

Impact tests were carried out using a drop weight system. Impact energies, in the range of 1 to 8 joules, were generated by dropping a spherically nosed projectile (1 cm diameter), loaded with different weights, through a height of 1 m. The area under test for each drop was confined to a circle 100 mm in diameter by a clamped ring system. The composites were ultrasonically c-scanned before and after impact and areas of damage after impact were measured from the scans. The composites were then cut into coupons 250 mm × 50 mm and tensile tests were carried out on half of the coupons as described above. In addition compression tests were carried out on the other coupons using an anti-buckling guide to inhibit Euler buckling. Coupons were tested on a servo-hydraulic test machined fitted with compression rated grips.

Results (mean values) from these tests are presented in Tables 1 and 2. FIG. 1 is a histogram of failure stress of a composite having a stacking sequence [±45°(0°)$_3$±45°(0°)$_2$]$_s$ where ±45° layers are woven layers, 0° layers are unidirectional non-woven layers and where the suffix S indicates that the composite is symmetrical, the sequence being repeated once, compared with the failure stress of an equivalent wholly unidirectional non-woven reinforced composite. In FIG. 1 the shaded columns represent the composite of the present invention and the unshaded columns represent the equivalent wholly unidirectional fibre reinforced composite.

EXAMPLE 2

For comparison purposes, composites with wholly non-woven unidirectional material in the same stacking sequence of 0°, ±45° used in Example 1, were made and tested as described in Example 1. The same materials were also used.

Results (mean values) from these tests are presented in Tables 1 and 2.

EXAMPLE 3

For comparison purposes composites with wholly woven and wholly non-woven unidirectional material in 0°, 90°; and ±45° lay-ups, using the same materials as used in Example 1 were made and tested as described in Example 1.

Results (mean values) of these tests are presented in Tables 3, 4 and 5.

TABLE 1

Summary of tensile properties of CFRP with 0°, ±45° lay-ups (50% 0° layers).

|  | 1st series | | 2nd series | |
| --- | --- | --- | --- | --- |
|  | mixed | non-woven | mixed | non-woven |
| thickness mm | 1.14 | 1.07 | 2.40 | 2.15 |
| strength ($\sigma_o$) MPa | 847 | 856 | 805 | 870 |
| modulus GPa | — | — | 66 | 72 |
| Poisson's ratio | — | — | 0.64 | 0.69 |

Mixed: non-woven 0° layers, woven ±45° layers

TABLE 2

Notch sensitivity of 0°, ±45° lay-ups of CFRP with woven and non-woven ±45° layers

|  | $\sigma_f \sqrt{\pi} a$ (MPa $\sqrt{m}$) | | $\sigma_f/\sigma_o$ | |
| --- | --- | --- | --- | --- |
| stacking sequence | mixed | non-woven | mixed | non-woven |
| [0°, ±45°, 0°]$_s$ | 40.9 | 42.2 | 0.42 | 0.40 |
| [±45°, (0°)$_2$]$_s$ | 48.4 | 49.1 | 0.43 | 0.43 |
| [±45°, 0°]$_s$ | 35.9 | 33.7 | 0.48 | 0.42 | mixed: non-woven 0° layers, woven ±45° layers
$\sigma_o$: tensile strength of plain specimens
$\sigma_f$: failure stress of specimen with notch of length 2a
a: semi notch length
s: symmetrical, the sequence repeated once.

TABLE 3

Summary of tensile properties of CFRP with 0°, 90° lay-ups of wholly woven and wholly non-woven material.

|  | 1st series | | 2nd series | |
| --- | --- | --- | --- | --- |
|  | woven | non-woven | woven | non-woven |
| thickness mm | 1.22 | 1.07 | 2.55 | 2.17 |
| strength ($\sigma_o$) MPa | 584 | 757 | 545 | 644 |
| modulus GPa | — | — | 50.2 | 60.1 |
| Poisson's ratio | — | — | 0.06 | 0.04 |

TABLE 4

Summary of tensile properties of CFRP with ±45° lay-ups of wholly woven and wholly non-woven material.

|  | 1st series | | 2nd series | |
| --- | --- | --- | --- | --- |
|  | woven | non-woven | woven | non-woven |
| thickness mm | 1.21 | 1.06 | 2.63 | 2.18 |
| strength ($\sigma_o$) MPa | 216 | 190 | 214 | 216 |
| failure strain % | — | — | 4.1 | 6.7 |
| modulus GPa | — | — | 16.3 | 17.1 |
| Poisson's ratio | — | — | 0.72 | 0.75 |

TABLE 5

Summary of notch sensitivity parameters for CFRP with woven and non-woven lay-ups.

| type of lay-up | $\sigma_f\sqrt{\pi}$ a (MPa $\sqrt{m}$) woven | non-woven | $\sigma_f/\sigma_o$ woven | non-woven |
|---|---|---|---|---|
| 0°, 90° | 28.7 | 44.1 | 0.40 | 0.48 |
| ±45° | 21.8 | 20.4 | 0.77 | 0.83 |

$\sigma_o$: tensile strength of plain specimens
$\sigma_f$: failure stress of specimens with notch of length 2a
a: semi notch length All the composites containing woven fabric were 12–17% thicker than wholly unidirectional fibre reinforced composites. About 10% of this difference in thickness was due to the lower fibre volume fraction of the woven fabric reinforced composites and the remainder was due to the fabric containing more fibre by weight than two non-woven layers to which a woven layer was equivalent.

Notch sensitivity parameters for sharp notches are given as $\sigma_f\sqrt{\pi a}$ and $\sigma_f/\sigma_o$. The former parameter is a measure of the toughness of a composite ie its ability to absorb released strain energy non-catastrophically, mainly by shear cracking and delamination at the notch. The parameter $\pi_f/\pi_o$ is a measure of the reduction in strength which occurs as a result of the notch being present, and the stress concentration factor at the notch tip.

Comparison of the CF composites according to the present invention as made in Example 1 with the wholly woven CF reinforced composites of Example 2 and the wholly unidirectional CF reinforced composites of Example 3 show that the mechanical properties of the composites of the CF composites according to the present invention are generally superior to the wholly woven CF reinforced composites and at least as good as the wholly unidirectional CF reinforced composites.

Damage zones at the notch tips were shown by ultrasonic C-scanning techniques to be of similar size (2–3 mm) for the composites of the present invention and equivalent wholly unidirectional fibre reinforced composites indicating that delamination between 0° and 45° layers was the same. It is worth noting that the damage zone size was smaller than the distance between weft and warp intersections. Stress concentrations at the notch tip in the composites of the present invention were generally lower than in the equivalent wholly unidirectional fibre reinforced composites.

Impact damage to the composites of the present invention was generally contained within a smaller area than that sustained by equivalent wholly unidirectional fibre reinforced composites. Damage was principally delamination between layers although at the point of impact there was some degree of tensile cracking towards the back surface and compressive buckling close to the front surface.

The residual strengths after impact, in tension and compression of the composites of the present invention were generally superior to those of the other composites.

In FIG. 2 which is a plot of residual tensile strength against impact energy, the line A represents the CF reinforced composites according to the present invention made in Example 1, and the line B represents the equivalent unidirectional CF composites made in Example 2. It can be seen that the residual tensile strength of the composites of the present invention is superior to that of the equivalent unidirectional CF reinforced composites at impacts above about 4 joules. In FIG. 3 which is a plot of residual compressive strength against impact energy, the line A represents the CF reinforced composites according to the present invention made in Example 1 and the line B represent the equivalent unidirectional CF composites made in Example 2. It can be seen that the residual compressive strength of the composites of the present invention is superior to that of the equivalent unidirectional CF reinforced composites at impact energies above about 2 joules.

The residual strengths in tension and compression after impacts of about 8 joules were significantly greater for the composites of the present invention than those of the equivalent unidirectional composites, both in terms of measured strength and in terms of the fractional reduction in strength. After a 7 joule impact the residual tensile strength of the composites of the present invention was 16% greater than that of the equivalent unidirectional composites. The greater residual strength observed could be related to the reduced area of impact damage, the containment of 45° cracking and to better residual properties in the woven +/−45° layers.

Residual compressive strength of the composites of the present invention after 5 joule impact was 16% greater than that of the equivalent unidirectional composite. This was probably because the smaller area of delamination in the composites of the present invention reduced the load for buckling instability.

Residual tensile and compressive strengths at maximum impacting energy (7 joules or 8 joules) are given in Table 6 as a fraction of the values of the undamaged composites.

TABLE 6

RATIO OF RESIDUAL STRENGTH AFTER IMPACT TO UNDAMAGED STRENGTH
(for 7 Joule impact unless stated)

| Lay-Up | Tension Woven | Non-Woven | Compression Woven | Non-Woven |
|---|---|---|---|---|
| 0.90 | 0.29 | 0.53 | 0.59 | 0.45 |
| +/−45$_A$ | 0.87 | 0.70 | 1.01 | 0.66 |
| 0, +/−45 | 0.83$_B$ | 0.66 | 0.73$_B$ | 0.44 |

A: residual strengths for 8J impact
B: mixed laminate - woven +/−45, non-woven 0

We claim:

1. A fibre reinforced composite comprising one or more layers of unidirectional non-woven fibres alternated with one or more layers of woven fibres having a pattern of weave which is a five or more shaft satin weave, all said fibres embedded in a plastic matrix, the outermost layers at the surface of the composite being of the woven satin fibres.

2. A composite as claimed in claim 1 and wherein the non-woven fibres are all arranged to lie generally parallel to a first axis and the woven fibres are all arranged to lie generally parallel to a second axis at 45° to the first axis and generally parallel to a third axis at 90° to the second axis.

3. A composite as claimed in claim 1 and wherein each woven fibre layer contained in the composite has at least one surface facing a neighbouring woven layer in the composite and forming an opposite pair of surfaces with the neighbouring surface, the opposite pair comprising a warp predominant surface and a weft predominant surface.

4. A composite as claimed in claim 1 and wherein the angle the line of fibre distortion makes with the weft direction is the same in the outermost woven layers at opposite ends of the stack of woven layers contained in the composite.

5. A composite as claimed in claim 4 and wherein the composite contains a stack of an even number of woven layers and the angles of the line of fibre distortions about the weft angles of the line of fibre distortions about the weft direction in the respective woven layers is balanced about the centre of the stack.

6. A composite as claimed in claim 5 and wherein the stack of woven layers contained in the composite comprises half having their warps running parallel to the said second axis and half having their wefts running parallel to the said second axis.

7. A composite as claimed in claim 1 and wherein the fibres in the woven layers comprise a mixture of carbon and aramid fibres containing from 0 to 30% aramid fibres based on the total number of fibres present.

* * * * *